US008537461B2

(12) United States Patent (10) Patent No.: US 8,537,461 B2
Schwertner et al. (45) Date of Patent: Sep. 17, 2013

(54) METHOD AND CONFIGURATION FOR THE OPTICAL DETECTION OF AN ILLUMINATED SPECIMEN

(75) Inventors: Michael Schwertner, Jena (DE); Ralf Wolleschensky, Jena (DE); Michael Kempe, Jena (DE)

(73) Assignee: Carl Zeiss MicroImaging GmbH, Jena (DE)

( * ) Notice: Subject to any disclaimer, the term of this patent is extended or adjusted under 35 U.S.C. 154(b) by 762 days.

(21) Appl. No.: 12/323,054

(22) Filed: Nov. 25, 2008

(65) Prior Publication Data

US 2009/0168158 A1 Jul. 2, 2009

Related U.S. Application Data

(60) Provisional application No. 60/990,007, filed on Nov. 26, 2007.

(51) Int. Cl.
*G02B 21/06* (2006.01)
(52) U.S. Cl.
CPC ..................................... *G02B 21/06* (2013.01)
USPC .......................................... 359/385; 359/368
(58) Field of Classification Search
None
See application file for complete search history.

(56) References Cited

U.S. PATENT DOCUMENTS

| 6,376,818 | B1 | 4/2002 | Wilson et al. |
| 2003/0086067 | A1 | 5/2003 | Gerstner et al. |

FOREIGN PATENT DOCUMENTS

| DE | 10257237 A1 | 6/2003 |
| WO | WO 02/12945 | 2/2002 |

OTHER PUBLICATIONS

Neil M.A.A., Juskaitis R., Wilson T.; "Method of obtaining optical sectioning by using structured light in a conventional microscope"; Opt. Left. 1997; 22(24):1905-1907.
Heintzmann R., Cremer C.; "Laterally modulated excitation microscopy: improvement of resolution by using a diffraction grating"; in Proc. of SPIE 1998; 3568:185-196.
Neil M.A.A., Juskaitis A., Wilson T.; "Real Time 3D fluorescence microscopy by two beam interference illumination"; Opt. Comm. 1998; 153:1-4.
Heintzmann R., Jovin T.M., Cremer C.; "Saturated patterned excitation microscopy—a concept for optical resolution improvement"; JOSA A 2002; 19(8):1599-1609.
Gustafsson M.G.L., Agard D.A., Sedat J.W.; "Doubling the lateral resolution of wide-field fluorescence microscopy by structured illumination"; Proc. of SPIE 2000; 3919:141-150.
Gustafsson M.G.L.; "Nonlinear structured-illumination microscopy: wide-field fluorescence imaging with theoretically unlimited resolution"; PNAS 2005; 102:13081-13086.
Stalder M. and Schadt M.; "Linearly polarized light with axial symmetry generated by liquid-crystal polarization converters"; Opt. Lett. 1996; 21:1948-1950.
Cragg, George E. and So, Peter T.C.; "Lateral resolution enhancement with standing evanescent waves"; Opp Lett. 2000; 25:46-48.

*Primary Examiner* — Derek S Chapel
(74) *Attorney, Agent, or Firm* — Duane Morris LLP

(57) ABSTRACT

A method for the optical detection of an illuminated specimen, wherein the illuminating light impinges in a spatially structured manner in at least one plane on the specimen and several images of the specimen are acquired by a detector in different positions of the structure on the specimen. An optical sectional image and/or an image with enhanced resolution is then calculated. The method includes generating a diffraction pattern in the direction of the specimen in or near the pupil of the objective lens or in a plane conjugate to the pupil. A structured phase plate with regions of varying phase delays is dedicated to the diffraction pattern in or near the pupil of the objective lens or in a plane conjugate to said pupil, and different phase angles of the illuminating light are set.

12 Claims, 10 Drawing Sheets

Rotation of the masks/phase structure

Figure 6. For selecting the diffraction orders and setting the relative phase angle between the diffraction orders.

METHOD AND CONFIGURATION FOR THE OPTICAL DETECTION OF AN ILLUMINATED SPECIMEN

CROSS REFERENCE

This application claims the benefit of U.S. provisional patent application Ser. No. 60/990,007 filed on Nov. 26, 2007, the contents of which are hereby incorporated by reference herein.

FIELD OF THE INVENTION

The present invention relates generally to the field of microscopy, and more particularly to microscopy in which structured illumination is used for depth discrimination in the wide field and for enhancing resolution and contrast.

BACKGROUND OF THE INVENTION

In microscopy, structured illumination is used for depth discrimination in the wide field [1][1] and for enhancing the resolution and the contrast [2]. Generally, a grating or another periodic structure is projected into the specimen [3] or an interference pattern is generated in the specimen by means of interference of coherent component beams [4]. Subsequently, images that differ from one another due to the shift of the illumination structure are suitably blended with one another so as to obtain an optical sectional image or an image with enhanced contrast and enhanced resolution [5,6].

[1] Bracketed references refer to the list of references at the end of the specification prior to the claims.

All of these methods have in common that different phase angles of the periodic structure are projected into the specimen; at the same time, it is desirable that the phase angle can be controlled as accurately as possible and that a rapid change between various settings of the phase angle can be made. An inaccurate shift of the projected structure can lead to artifacts (e.g., striation) in the image. The accuracy, speed, reproducibility and calibratability of the setting of the phase angle are therefore very important characteristics for implementing such a method for structured illumination.

In addition, in some approaches to the implementation of the method of the structured illumination, in particular in the high-resolution approach [7], a rotation of the orientation of the projected structure is required.

SUMMARY OF THE INVENTION

The invention relates to the implementation of a structured illumination method. Compared to the prior art, the proposed configuration has been simplified and can offer the advantage of making a high scanning speed possible. In addition, in developing the invention, the precision of the phase shift of the periodic structure is no longer critically dependent on the precision of the final control elements. The precision is predetermined solely by the quality of a phase element. This is a significant advantage over the prior art and obviates the repeated recalibration of the configuration and can help reduce artifacts. In addition, the proposed configuration is able to operate with a wide range of wavelengths, and the phase shift as well as the orientation of the projected structure can be set requiring only a single mechanical actuator.

In the introduction below, the underlying principles will be described prior to providing detailed explanations of practical examples according to the present invention.

In the literature (identified in the list of references at the end of this specification and before the claims), a distinction is made between two types of structured illumination, with the first type being used to enhance the lateral resolution and also requiring that the orientation of the illumination structure (e.g., a line structure) generated in the specimen space be changed. The second type of structured illumination can be used to generate optical sections without leading to an enhancement of the lateral resolution (Zeiss APOTOM). The present invention can be used for both types of structured illumination or even for combinations of the two.

The configurations according to the present invention are based on the observation that a periodic structure (for example, a grating) which is located in a plane conjugate to the specimen and which generates structured illumination in the specimen generates a diffraction distribution in the pupil of the objective lens. In addition, advantage is taken of the knowledge that the direct manipulation of the diffraction orders in the pupil determines the shape of the produced illumination structure in the specimen. Manipulating the diffraction orders can include: selecting or suppressing certain orders, rotating the diffraction orders in the pupil plane about the optical axis of the configuration, or setting the relative phase between the diffraction orders before they enter into the pupil of the objective lens used. By selecting or rotating the diffraction orders in the pupil, it is possible to influence the orientation of the illumination structure. The relative phase angle between the diffraction orders controls the phase angle of the structured illumination.

In a first practical example of the invention, a type of implementation will be used, which, in addition to setting the phase angle, allows the orientation of the projected structure in the specimen to be changed and, within a certain range, is independent of the wavelength of the light of the projected structure used. The property of wavelength independence and the possibility of setting the orientation are not required in all applications or implementations. The implementation of these additional properties is therefore optional. The invention comprises the combined implementation of all three properties (phase shift, change in orientation, wavelength independence) but is not limited to this combination.

In a first measure, a periodic structure is added in an intermediate image plane conjugate to the specimen. Preferably, this is a periodic phase structure. The simplest embodiment can be a phase grating (line grating); however, two-dimensional structures are also conceivable.

Below, the invention will be explained using an implementation which makes it possible to orient the illumination structure in N/2=3 directions, and given a suitable design, another number of orientations is possible as well. A two-dimensional grating, such as shown in FIG. 1, can be used as the periodic structure.

BRIEF DESCRIPTION OF THE DRAWINGS

FIG. 16(*b*) is a top view illustrating the micro-optical module of FIG. 16(*a*) with a sightline perpendicular to the optical axis.

DESCRIPTION OF THE EMBODIMENTS OF THE INVENTION

The invention will now be explained in detail based on practical examples.

Figure 1:
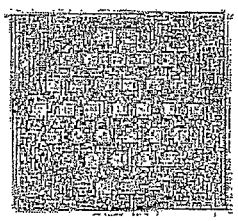
FIG. 1 illustrates an illumination structure grating disposed in an intermediate image plane conjugate to the specimen.

FIG. 1 shows a structure (phase structure, honeycomb structure) that is disposed in an intermediate image plane conjugate to the specimen, in this case, with an N=6-fold symmetry. The circular ring marks the illumination.

The structure shown in FIG. 1 generates a diffraction pattern in the pupil, again with a 6-fold symmetry of the diffraction orders, with oppositely lying pairs of the illumination corresponding to the orientation of one structure in one spatial direction.

Figure 2:
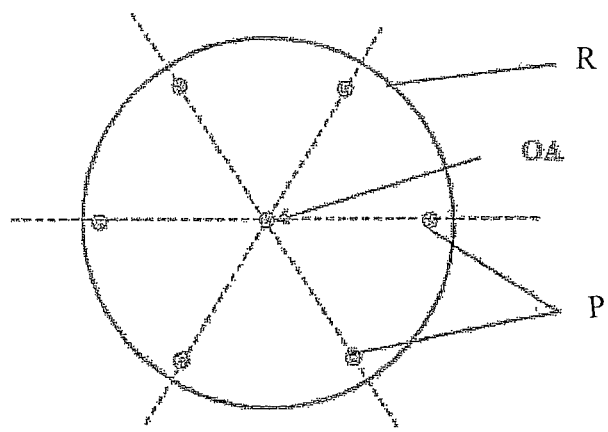
FIG. 2 illustrates a typical illumination distribution in the pupil of the objective lens or in a plane conjugate to said pupil.

A typical illumination distribution in the pupil of the objective lens or in a plane conjugate to said pupil is shown in FIG. 2. The light distribution generated by the structure shown in FIG. 1 in the pupil is illustrated. The points P drawn in are the sites of the diffraction orders, and the ring R shows the boundary of the pupil. The $0^{th}$ diffraction order is preferably located on the optical axis OA. Given an N=6-fold symmetry, a rotation of the illumination pattern by $\phi$=360/N=60 degrees about the optical axis would reproduce the original structure. The broken lines connect the diffraction orders which lead to the structure in one spatial direction.

Next, an additional element is disposed near the pupil or in a plane conjugate to said pupil. According to the present invention, this element comprises a diaphragm which will be described in greater detail below. The function of this diaphragm is the selection and/or suppression of certain diffraction orders.

Figure 3:
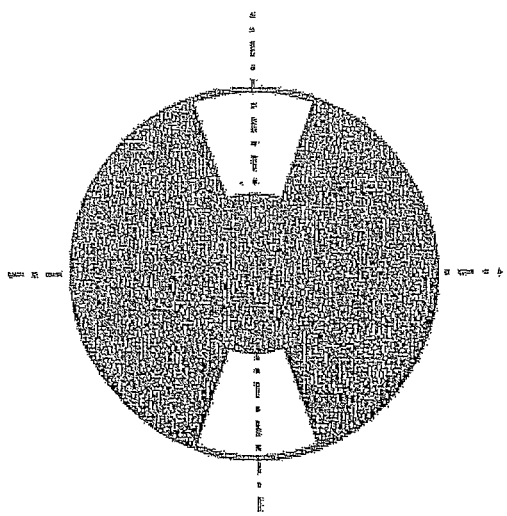
FIG. 3 illustrates a diaphragm structure.

This type of diaphragm structure is shown in FIG. 3. It comprises two openings that are symmetrically opposite with respect to the optical axis, with the size of the angle segments occupied by these openings corresponding approximately to the angle defined by the symmetry of the diffraction pattern $$\phi=360/N$$

or being slightly larger. In FIG. 3, the two openings are white, the circle segments correspond to an angle of $\phi$. The optical axis is located at the intersection of the axes of symmetry that are identified by the broken lines.

A diaphragm structure can be combined with a phase structure and is disposed in the pupil or in a plane conjugated to the pupil.

According to the present invention, the diaphragm, depending on the diaphragm setting, selectively transmits only certain diffraction orders in the diffraction image in the pupil, which diffraction orders, relative to the optical axis, lie opposite each other. Thus, by rotating the diaphragm, specific diffraction orders can be selected, and the orientation of the illumination structure in the specimen can be influenced.

As an alternative to the use of the diaphragm structure shown in FIG. 3 in combination with the two-dimensional grating shown in FIG. 1, it is also possible to use a grating which is preferably structured only in one dimension (e.g., a line grating) and which generates a pair of points (depending on the type of lattice, with or without the $0^{th}$ order) as in FIG. 2 in a position conjugate to the specimen, and to rotate said grating about the optical axis. In comparison to the combination of a 2-D grating and a diaphragm for selecting diffraction orders, this configuration has an increased light yield but, compared to one of the following practical examples, it also requires an additional final control element to rotate the grating. The shift of the phase angle also takes place as described below for the combination of the 2-D grating and the diaphragm.

Below, the manipulation of the relative phase of the diffraction orders, as it can be used to shift the periodic structure in the specimen, will be explained.

According to the present invention, a structured phase plate is added to the configuration. This phase plate can be disposed on a separate element near the pupil or it can be inserted into one or both openings of the diaphragm shown in FIG. 3. Without loss of generality, the use of only one phase plate will be described in this document, which phase plate is inserted into the upper opening of the mask seen in FIG. 3 and which, in combination with the diaphragm, forms a functional unit. Such an integrated combination of a phase plate and a diaphragm is illustrated in FIG. 4.

Figure 4:
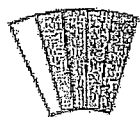
FIG. 4 shows a phase structure which is inserted into the upper opening of the diaphragm shown in FIG. 3.

FIG. 4 shows a phase structure which is inserted into the upper opening of the diaphragm shown in FIG. 3. The different gray values of the equidistantly divided circular sectors correspond to different phase delays with fixed, predefined steps. For a given wavelength ), the phase difference between two neighboring circular sectors is $$\sigma=2\pi/P,$$

wherein the phase difference $2\pi$ corresponds to an optical path difference of $\lambda$.

At a minimum, the phase structure has three different phases which correspond to three setting steps (without $0^{th}$ order). With the $0^{th}$ order, which, through an opening in the center of the diaphragm (not shown in FIG. 3 or any relevant subsequent figures) on the specimen, at least 5 phases are required.

FIG. 4 illustrates a phase element for P=5 phase steps, which phase element comprises 5 sectors. In a useful embodiment of the invention, the angle segments of the phase element are divided into angle segments measuring $$\gamma=\phi/P.$$

Figure 5:
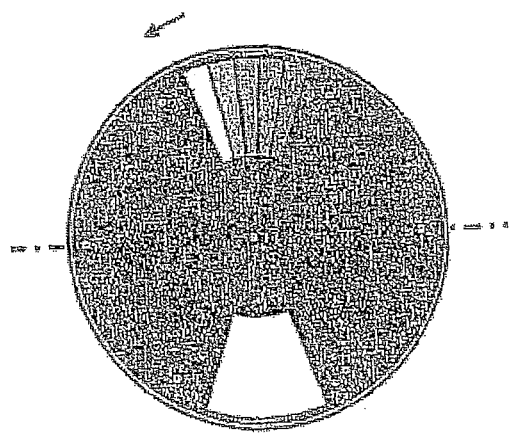
FIG. 5 illustrates a mask with a phase structure.

FIG. 5 shows the mask with the phase structure as it is disposed in the pupil. The mask and the phase structure are rigidly connected to each other and disposed so as to be able to pivot about the optical axis.

FIG. 5 shows the configuration of the masks/phase structure in the pupil. The rim of the pupil is marked by a red circle. The sites of the diffraction sites in the pupil are marked in green as in FIG. 2.

By rotating the structure shown in FIG. 5 in the pupil plane, the diffraction orders in the pupil are selected. Only the oppositely lying orders (symmetrical) pass the mask; all other orders impinge on nontransparent regions of the mask. This sets the orientation of the structure generated in the specimen. In addition, by means of smaller rotational steps, an alternation between two circle segments of the phase element takes place. As a result, the relative phase difference of the [sic; word or words missing] through the two oppositely lying openings of the mask is reset. This functioning mode is illustrated in FIG. 6.

Figure 6:
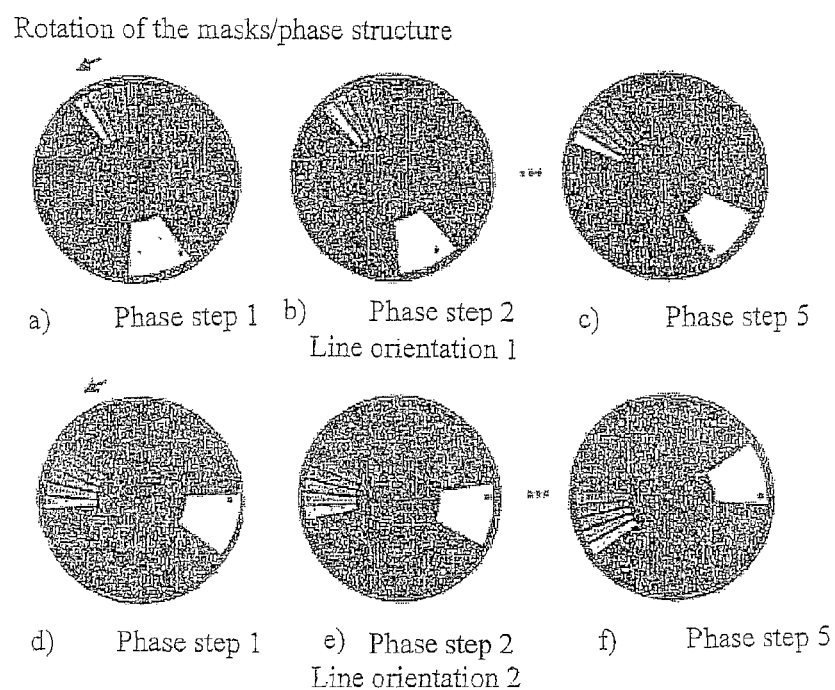
FIG. 6 shows the selection of the diffraction orders and the setting of the relative phase angles between the diffraction orders.

FIG. 6 shows the selection of the diffraction orders and the setting of the relative phase angles between the diffraction orders.

The line distribution generated in the specimen has an orientation 1 in the component images a) to c) and an orientation 2 in the component images d) to f), since different pairs of diffraction orders can pass through the mask. In addition, 3 different phase steps of the generated structure are shown since the diffraction orders transmitted through the two openings of the mask structure undergo different relative phase shifts, depending on the sector of the phase plate in which the diffraction orders are located. To set the phase step, only small adjustment steps are required, which makes it possible to reach a high speed. In addition, by continuously rotating the element, it is possible to pass through a sequence of phase steps and orientations of the structure, and the angle position of the element can be synchronized with the image acquisition by utilizing an appropriate angle encoder.

It should be emphasized that the precision of the relative phase shift does not depend significantly on the precision (angular resolution) of the shift of the phase plate and/or the mask. This is an important advantage over the prior art [8,9] since, according to the present invention, the precision of the relative phase steps now only depends on the quality of the phase plate. As a result, a calibration is no longer required and a disadjustment is impossible. The only prerequisite is that the angle be positioned in a manner to ensure that the two diffraction orders are located in the correct sector of the phase plate. The adjustment precision and reproducibility required to position the angle are of comparably little importance. In a useful embodiment of the invention, it is therefore possible to solve this problem through the use of a conventional stepping motor. In contrast to the prior art [9,8], neither piezo actuators nor galvanometer scanners are required to shift the phase. This constitutes a considerable cost advantage.

The configuration according to the invention as explained above is dependent on the light wavelength used, and it is therefore preferable to use monochromatic light. According to the present invention, the proposed configuration can be modified in such a manner that it can operate in a whole range of wavelengths. This chromatic correction will be explained in greater detail below.

Figure 7:
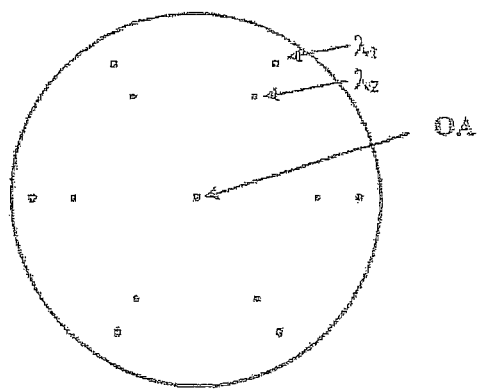
FIG. 7 illustrates the diffraction distribution in the pupil generated by the grating shown in FIG. 1.

Looking at FIG. 7, we will first consider the effects of a second wavelength (blue marked diffraction orders) in a blue shift relative to the first wave length (green marked diffraction orders). Here, the smaller wavelengths are less strongly diffracted and are therefore located at a shorter radial distance from the optical axis.

FIG. 7 illustrates the diffraction distribution in the pupil generated by the grating shown in FIG. 1. The points closer to the axis are the sites of the diffraction orders of the longer wavelength $\lambda_1$, and the points located farther away mark the sites of the diffraction orders of the shorter wavelength $\lambda_2$. The ring marks the boundary of the pupil. The $0^{th}$ diffraction order is preferably located on the optical axis OA.

Figure 8:
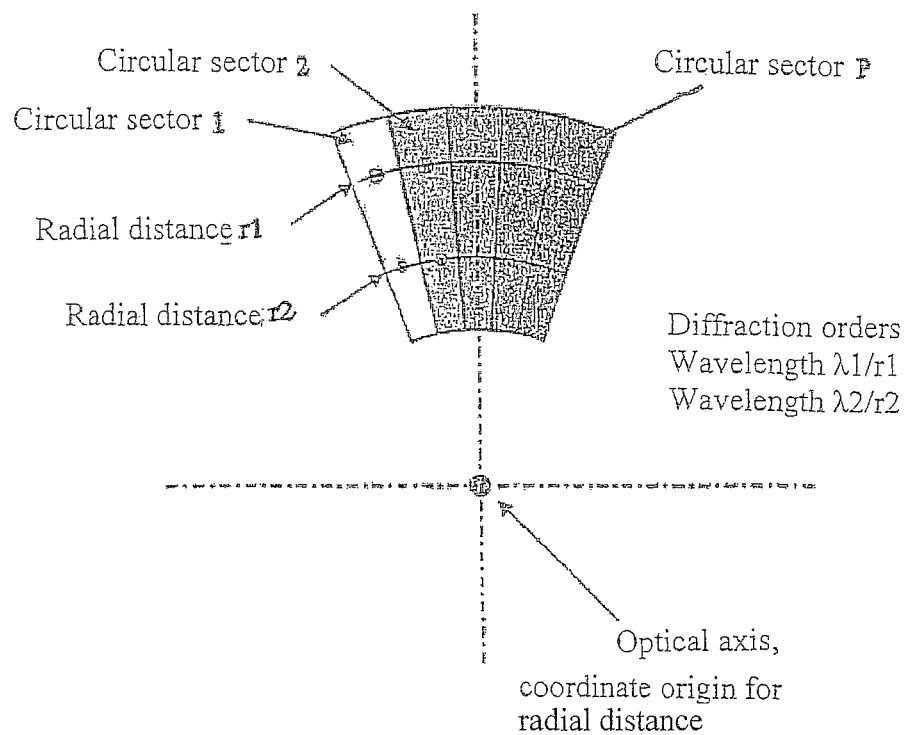
FIG. 8 shows a modified phase plate which makes chromatic correction possible.

A chromatic correction of the configuration can now be implemented by an additional radial dependence of the phase delay of the phase plate shown in FIG. 4. This is illustrated in FIG. 8. The radial dependence is selected to ensure that, when switching to the next sector (by rotating the element), for each wavelength, the same correct phase jump, relative to the wavelength, occurs.

FIG. 8 shows a modified phase plate which makes chromatic correction possible.

The diffraction orders of the wavelengths λ1 and λ2 are located at different radial distances r1 and r2 from the optical axis within a plane conjugate to the pupil. As already mentioned earlier, the light distribution in the pupil is generated by the element illustrated in FIG. 1. Thus (see FIG. 8):

$$\lambda 1 > \lambda 2 \text{ and } \lambda 1 / \lambda 2 = r1/r2.$$

FIG. 8 illustrates the example of a phase plate with P=5 phase steps. Thus, for any wavelength λ, the diffraction order of which is located at a distance r, the optical path difference OPD generated by the phase plate must be:

$$OPD = \lambda/P.$$

From this follows that the phase plate for chromatic correction must have an optical path difference that must be proportional to the radius r. According to the present invention, the radial dependence of the phase plate can be continuous or quasi-continuous. If a discrete number of fixed wavelengths are used, the radial dependence of the phase plate may also be constant in certain sections.

Figure 9:
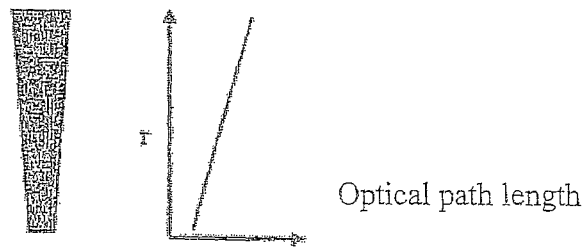
FIG. 9 shows the radial dependence of the phase mask for the chromatic correction of the configuration.

An example of a chromatic correction of the phase plate for a random distribution of wavelengths is illustrated in FIG. 9. Here, only a single sector of the phase mask is shown; the gray values represent the position-dependent optical path length which can be implemented, e.g., by variable plate thicknesses or suitable refractive index changes, and which is directly proportional to the radial distance r.

FIG. 9 shows the radial dependence of the phase mask for the chromatic correction of the configuration. The optical path length changes (preferably) linearly with the radius.

It should be emphasized that the chromatic correction as described above is a useful but by no means necessary feature of a configuration for structured illumination. Using suitable calibration, the wavelength-dependent phase steps can be determined and properly factored into the algorithms.

For energy reason, among other things, it may be useful not to block all but two diffraction orders in the pupil by means of a diaphragm as described above. In this case, it is possible to allow simultaneous structuring in all those spatial directions that are generated by the element in the intermediate image plane by means of diffraction. Compared to the sequential acquisition of the images with different structure directions, the number of the images to be acquired at different phase angles remains the same. The phase angles can now be set by exchanging the element shown in FIG. 5 for a completely transparent (phase) element as seen by way of an example in FIG. 10.

Figure 10:
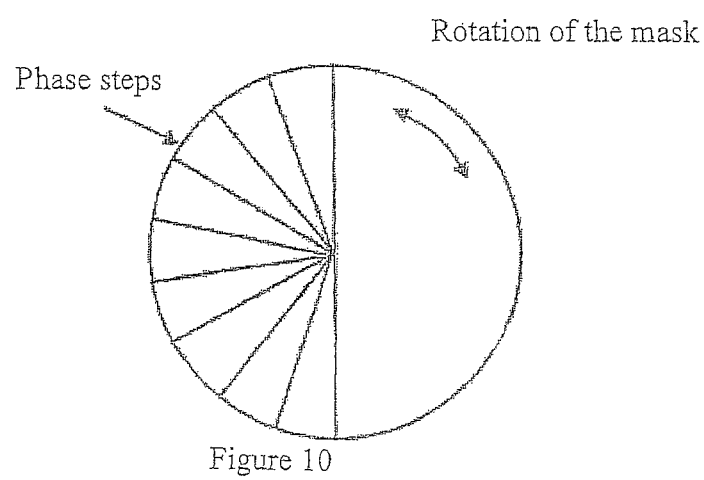
FIG. 10 shows a modified phase element.

FIG. 10 shows a modified phase element in or near the pupil plane (or a plane conjugate to said pupil plane) for the above-mentioned simultaneous structuring in several spatial directions. By rotating the mask shown, the phase angles of the structure directions are set. The number of phase steps is N/2*P. With the structure of FIG. 1 (N=6) and with P=3, one obtains 9 phase steps. As described above, each segment can have a radial phase shape so as to allow equidistant phase steps for different colors.

Figure 11:
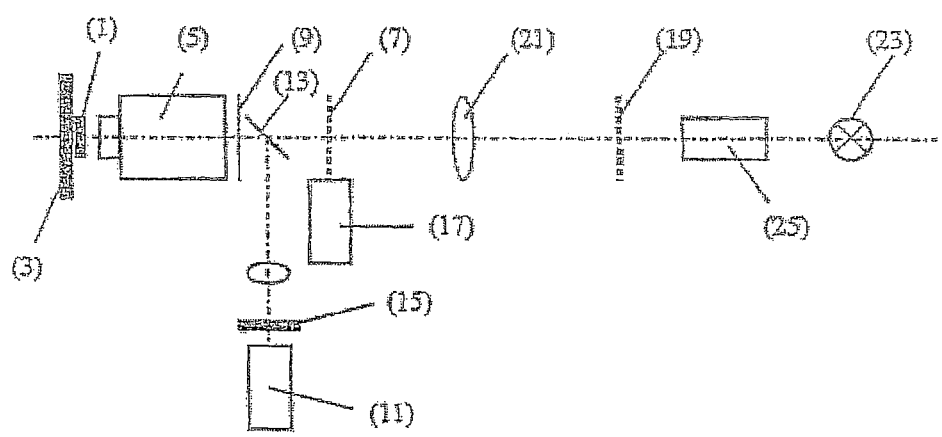
FIG. 11 is a schematic diagram of a configuration of the present invention for fluorescence microscopy.

A typical configuration according to the present invention for fluorescence microscopy will be explained below based on FIG. 11. The specimen (1) is attached to a specimen holder (3) that can be positioned in front of the microscope objective lens (5). The elements with phase structure (7) described and shown in FIGS. 5 and 10 are disposed near the pupil (9) of the microscope objective lens (5) or in a plane conjugate to said pupil. Also included is an area detector (11) (e.g., a CCD). The configuration for fluorescence detection described also comprises a main color divider (13), for separating fluorescent light and excitation light, and an emission filter (15). The mask (7) can be moved by means of an actuator (17), which can be a stepping motor to rotate the mask or a liner drive. A stepping motor can drive a circular mask directly or indirectly via a gear unit or another mechanical unit. An additional mask (19) is disposed in an intermediate image plane which is conjugate to the specimen plane (1) and which is generated by the barrel lens (21). The light source (23) illuminates the element (19) and can be, for example, a laser, an LED, a high-pressure mercury lamp or a conventional incandescent lamp. Also included can be an optional collimation optics system (25). The light source (23) can be monochromatic or emit several wavelengths simultaneously or sequentially.

In a preferred embodiment of the present invention, the phase mask and the diaphragm for making a selection are disposed in or near the pupil of the objective lens. However, due to design features, the pupil in many microscope objective lenses is not directly accessible. In this case, a relay optics system can be used to generate an intermediate image in a freely accessible intermediate image plane, in the vicinity of which the phase mask and the diaphragm can be disposed.

Figure 12:
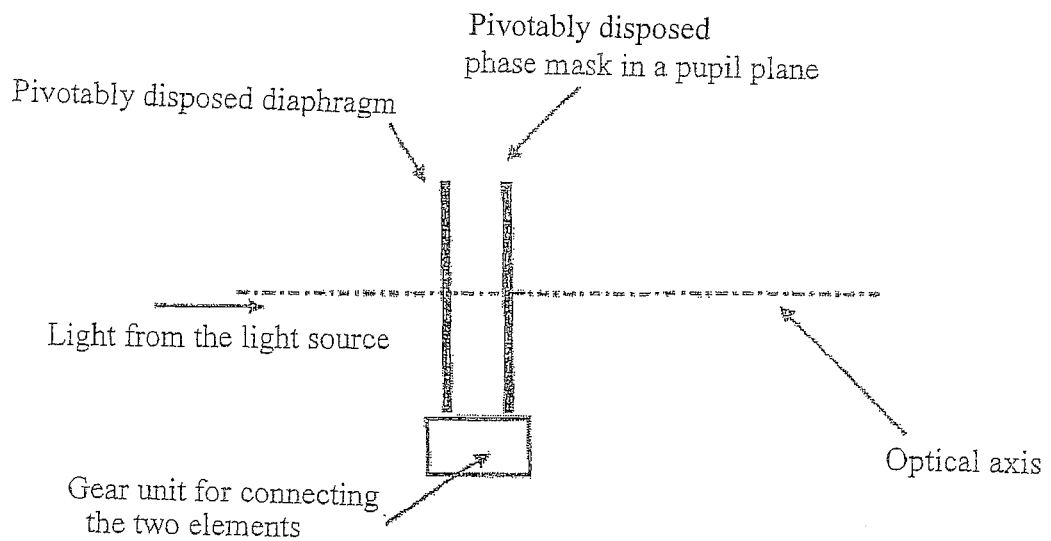
FIG. 12 illustrates a configuration in which the diaphragm and the phase mask are connected via a gear unit.

Depending on the distance of the phase mask from the pupil plane, the diameter of the individual diffraction orders (see FIG. 2) will increase with the distance from the pupil plane. Thus, the extension of the diffraction orders in the tangential direction also defines and limits the minimum size of the sectors of the phase plate (see FIG. 5). According to the present invention, this problem can be solved with a useful configuration in which the diaphragm for selecting the diffraction orders and the phase element are located on two different elements that are rigidly connected to each other, with both elements being disposed so as to be able to pivot about the optical axis, with a gear unit coupling the two elements and defining the ratio between the rotational speeds. This type of configuration is illustrated in FIG. 12, which shows a lateral view perpendicular to the optical axis. This configuration has the advantage that a diaphragm with a relatively small opening can be combined with a phase element with relatively large angular segments and that to move the two elements, only a single actuator (e.g., a stepping motor) is required. The chromatic correction in the radial direction is also influenced by the size of the diffraction orders in the plane of the mask, which must be factored in during the construction of the mask. It is therefore generally useful to position the mask as far as possible in the pupil plane to minimize these effects.

FIG. 12 shows a configuration in which the diaphragm and the phase mask are connected via a gear unit. The entire configuration is disposed in or near the pupil of the objective lens. The diaphragm for selecting the diffraction order (left in FIG. 12) can have a form as illustrated in FIG. 3. The phase mask (right in FIG. 12) can have the form as illustrated in FIG. 10. The gear unit connects the two elements and can be located near the optical axis or at the rim of the diaphragm and/or mask. The mounting support for the diaphragm and/or mask can itself be constructed as a gear wheel which is disposed so as to pivot about the optical axis.

Figure 13:
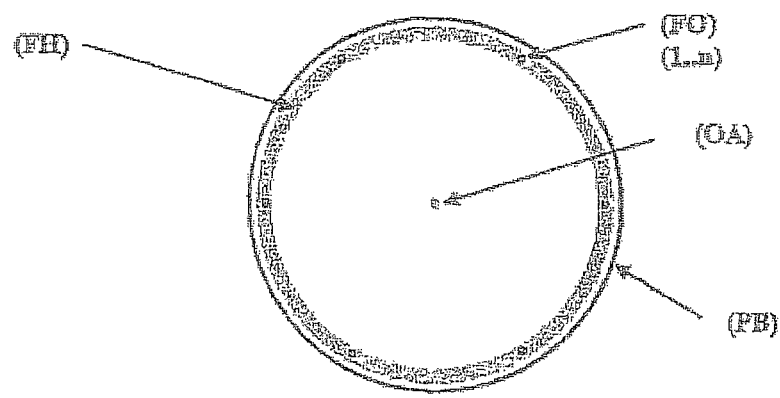
FIG. 13 shows the view of a plane perpendicular to the optical axis (OA) in which the outputs of fiber optics (FO) are held in place by means of a ring-shaped fiber holder (FH).

According to another embodiment of the present invention, the light distribution in the pupil can be generated directly by positioning optical fibers in the pupil of the objective lens instead of having it be diffracted by a periodic structure. This type of configuration is shown in FIG. 13. As can be seen, n outputs (in this case, n=6) of the fiber optics (FO) are disposed near the pupil, which outputs are held in position by a fiber holder (FH). The optical axis (OA) is disposed perpendicular to the drawing plane and (PB) marks the pupillary boundary. Each of the outputs of the fiber optics (FO) can comprise a micro-optical unit, for example a microlens, a structured surface or a special coating.

FIG. 13 shows the view of a plane perpendicular to the optical axis (OA) in which the outputs of fiber optics (FO) are held in place by means of a ring-shaped fiber holder (FH). (PB) marks the boundary of the pupil.

The configuration of fibers in the pupil has the advantage that the orientation of the illumination structure in the specimen can be determined very rapidly by switching the light to certain fiber outputs. This can be accomplished, for example, by electronically switching light sources which are dedicated to the individual fiber outputs. In addition, the fiber optic switch (FSE) can be designed to ensure that the light can be rapidly switched between the individual fiber outputs (by switchable light coupling or blocking).

Figure 14:
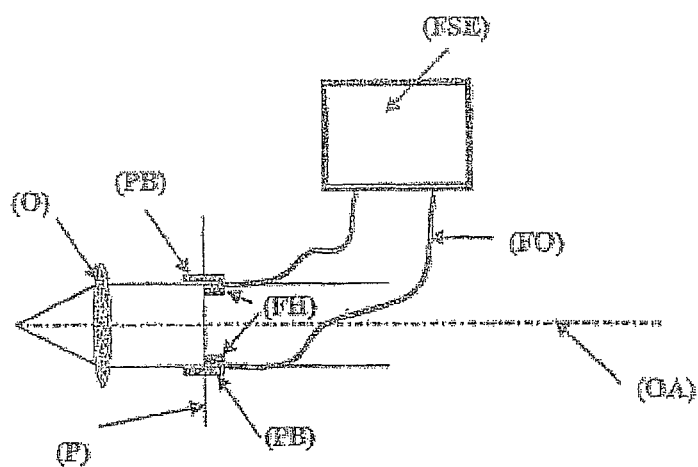
FIG. 14 is a lateral view illustrating a fiber-based implementation of structured illumination.

FIG. 14 shows a lateral view to illustrate the fiber-based implementation of structured illumination: The optical axis (OA) of the objective lens (O) passes through the pupil (P) of the objective lens. The fiber optics (FO) are placed near the pupillary boundary (PB) and held in position by means of the fiber holder (FH). In this illustration, only two fiber optics are shown, but it is also possible to use a larger number. The fiber optic switching unit (FSE) can switch light onto certain fibers and also set the relative phase of the light emitted by the fiber optics.

Such a configuration for structured illumination using an optical fiber implementation is shown in FIG. 14. The Figure shows a lateral view in which the optical axis is disposed in the drawing plane. The outputs of the fiber optics (FO) are disposed near the pupil (P) of the objective lens (O), with (PB) marking the boundary of the pupil. To simplify the drawing, only two fibers are shown in the figure, but a larger number can be used. The optical fiber switching unit (FSE) has several functions: it contains a light source and/or possibilities for manipulating the spectral composition of the light used. In addition, the unit (FSE) can selectively distribute the light to a combination of certain fibers and also control the relative phase angle of the light between the active outputs of the fiber optics (FO).

As already mentioned, the pupil of the objective lens is not always directly accessible. Therefore, regardless of the implementation (e.g., fiber configuration or use of phase plates), it may be necessary to make the pupil accessible by means of an intermediate image. Intermediate images of this type are known from the prior art and can be implemented by means of intermediate optics systems. For the sake of clarity, such intermediate optics systems have been omitted in the drawing accompanying this document. However, these intermediate optics systems can be used if required by the conditions of the optical configuration.

Figure 15:
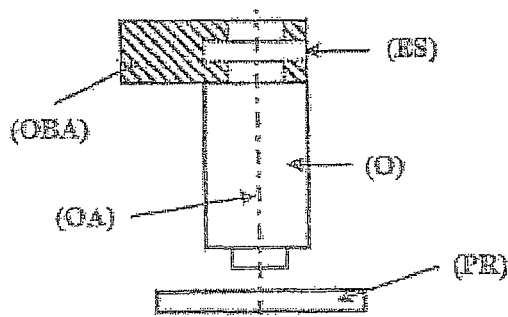
FIG. 15 is a lateral view illustrating how an existing optical microscope system can be modified.

Yet another practical example according to the present invention uses a combination of optical fibers and a microoptics system to implement the described method for the structured illumination and to generate the required illumination distributions in the pupil. Especially in microscope objective lenses, the plane of the pupil of the objective lens in most cases is located within the objective lens, but can be made accessible by means of an intermediate image. The configuration described solves the problem of generating the illumination distribution and the intermediate image in an especially compact manner and is therefore especially suitable for integration into existing microscopic systems. FIG. 15 shows the lateral view of a microscope objective lens (O) with a lateral slide-in compartment (ES) which is often used to hold DIC (differential interference contrast) prisms. The mechanical slide-in compartment (ES) inside the objective lens holder (OBA) is often an integral part of the lens turret.

FIG. 15 shows a lateral view to illustrate how an existing optical microscope system can be modified. Optical axis (OA), objective lens (O), specimen (PR), objective lens holder (OBA), slide-in compartment (ES).

Next, a component will be described which is preferably disposed in the area of the slide-in compartment (ES) in FIG. 15 and which solves the problem of generating illumination distributions according to the present invention.

Figure 16:
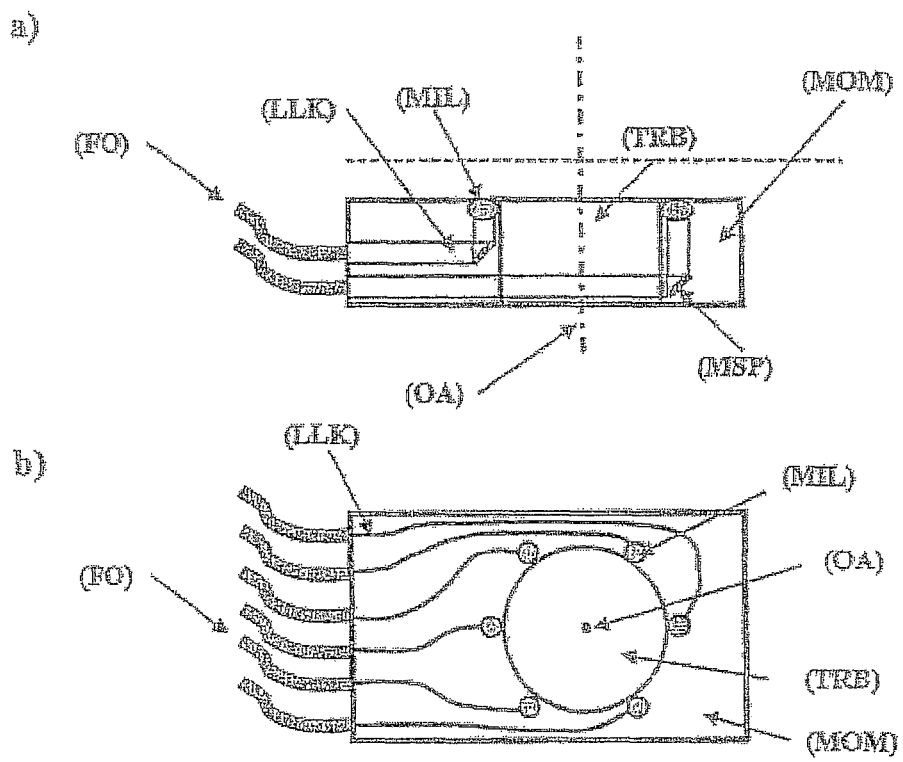
FIG. 16(*a*) is a lateral view illustrating a micro-optical module.

FIG. 16 shows a micro-optical module (MOM) from a lateral view a) and from a top view with a sightline perpendicular to the optical axis b). The micro-optical module (MOM) is preferably connected to the fiber optics (FO) and can comprise a combination of the following micro-optical components: fiber optic light guide, optical beam dividers, micro-optically integrated mirrors, microlenses.

In the illustration according to FIG. 16, the fiber optics (FO) are connected to the light guide channels (LLK). The entire module (MOM) can be inserted into the slide-in compartment (ES), with the upper surface of the module facing the objective lens. (OA) marks the optical axis of the objective lens. Micro-optically integrated mirrors (MSP) can be used to deflect the light fed in by way of the fiber optics (FO). The microlenses (MIL) emit the fed-in light and preferably focus it into the plane of the pupil of the objective lens (not shown).

FIG. 16 serves to illustrate a micro-optical module (MOM). View a) is a lateral view perpendicular to the optical axis (OA) of the microscope objective lens (FIG. 15), and b) is a top view of the module. The entire assembly can be inserted into the slide-in compartment (ES) shown in FIG. 15. The axis marked by (OA) is the axis in the inserted state of the compartment and is defined in FIG. 15. The fiber optics (FO) are connected to the light guide channels (LLK). Micro-optically integrated mirrors (MSP), microlenses (MIL) and a preferably circular transparent region (TRB).

Although, for clarity's sake, the light guide channels (LLK) in FIG. 16a) are shown one on top of the other, it is preferable to dispose them in a single plane. The transparent region (TRB) is transparent to the light to be detected, which light comes from the objective lens. In FIG. 16, this region is smaller than the circular region that is defined by the microlenses (MIL). The light coming from the specimen will fill at least this region. It may therefore be useful to lay out this region in a size large enough to correspond to the maximum illuminated region in this area. Since the microlenses (MIL) and all channels (LLK) cause losses, a construction optimized for transmission (e.g., by having the channels serve as waveguides) is to be preferred. Preferably, it is implemented in the form of a recess in the substrate of the micro-optical module (MOM). It is useful to dedicate exactly one fiber optics (FO) to each microlens (MIL). In FIG. 16b), the light guide channels (LLK) which form the connection between the fiber optics (FO) and the microlenses (MIL) as well as the micro-optically integrated mirrors (MSP) are not shown in detail but only schematically by means of lines (LLK). The fiber optics (FO) are preferably connected to a fiber optic switching unit (FSE) as shown in FIG. 14 and explained in the text associated with this figure. This fiber optic switching unit makes it possible to switch the light in the individual fiber optics (FO) in a targeted manner; in addition, it is possible to set the relative intensity in the fiber optics as well as the relative phase of the light in the individual channels. This type of fiber optic switching unit can be based on piezo actuators. To generate point-shaped light distributions at the site of the plane of the pupil of the objective lens, the focal length of the microlenses (MIL) used can be appropriately adjusted.

Figure 17:
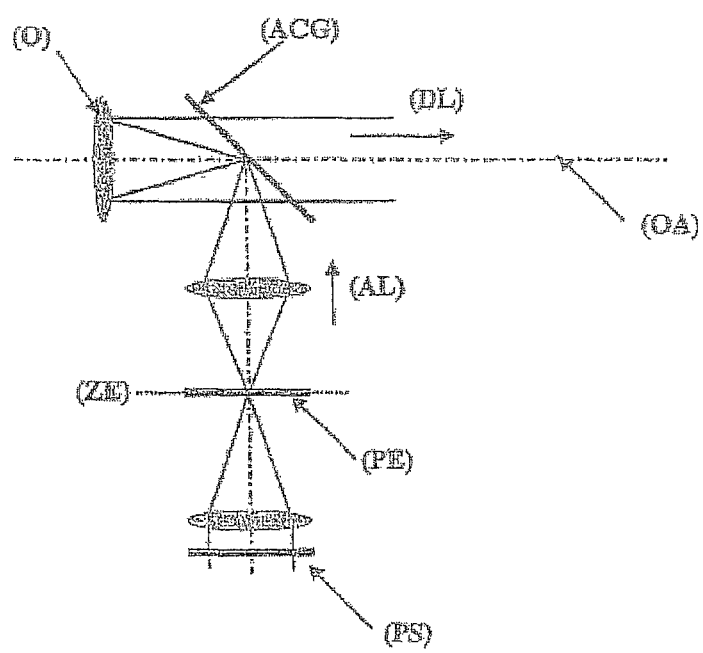
FIG. 17 illustrates another practical example of a configuration which makes the pupil accessible by way of an intermediate image.
Figure 18:
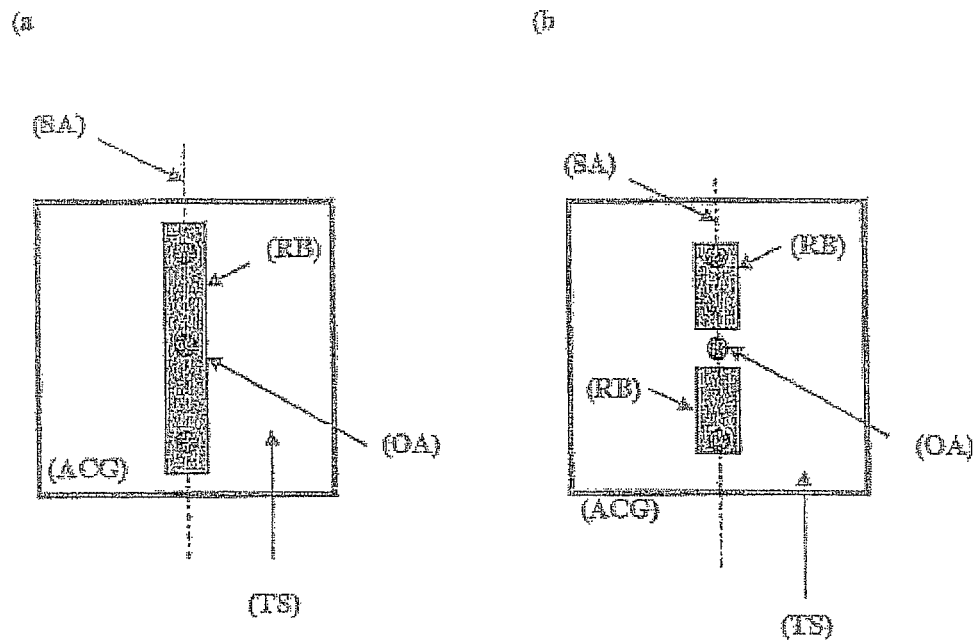
FIGS. 18(*a*) and (*b*) illustrate two variants of an achromatic beam divider.

Yet another practical example will describe a configuration which makes the pupil accessible by way of an intermediate image, on the one hand, and which makes it possible to use an achromatic color divider with high efficiency (as described in [10]), on the other hand. An optical configuration of this type is shown in FIG. 17. The periodic structure (PS), which can have the form shown in FIG. 1, is illuminated, and the diffraction image is imaged by means of optical elements into an intermediate plane (ZE) which is conjugate to the pupil of the objective lens and in which the phase element (PE) is located. The diffraction orders of the periodic structure are preferably focused into the intermediate plane (ZE). The phase element (PE) can have the form shown in FIGS. 4, 5 and 8 and is preferably disposed so as to be able to move. As described earlier, the function of the phase element is to adjust the relative phase angle of the diffractions orders relative to one another. By means of an additional intermediate optical system, the intermediate plane (ZE) is imaged onto the beam divider (ACG). This element (ACG) comprises a transparent substrate with one or more reflecting regions as shown in FIG. 18. The principle of the achromatic beam divider is described in [10]. Details will be discussed in a practical example below. The beam divider (ACG) feeds the excitation light (AL) to the objective lens (O). The detected light (DL), which is preferably fluorescent light, is transmitted through the transparent regions of the beam divider and is fed to an associated detection unit which can contain the area receiver. The achromatic beam divider (ACG) is preferably disposed in or near the pupil of the objective lens (O) or in a conjugate plane of the beam path.

FIG. 17 shows an example in which the subject matter of the present invention is combined to advantage with the concept of an achromatic beam divider. Optical axis (OA), objective lens (O), excitation light (AL), detection light (DL), intermediate plane (ZE), periodic structure (PS), phase element (PE), achromatic beam divider (ACG).

In the following section, a practical example of an achromatic beam divider (ACG) will be described, such as can be used in the configuration shown in FIG. 17. In FIG. 18, two variants a) and b) of the achromatic beam divider (ACG) are shown. The Figure shows a transparent substrate (TS) with reflecting regions (RB). The element (ACG) is configured in such a manner that (OA) marks the pass point of the optical axis through the substrate (TS), and the axis of symmetry (SA) of the element (ACG) in FIG. 17 is perpendicular to the drawing plane. The two variants a) and b) differ in that element a) reflects on the optical axis while variant b) in the region of the optical axis does not reflect and has a high transmissivity. The site of the optical axis at the same time is also the position of the $0^{th}$ diffraction order. In variant b), the $0^{th}$ order is not reflected because of the transparency at this site and therefore does not reach the specimen in the form of excitation light. This can enhance the contrast of the illumination structure on the specimen. The achromatic beam divider (ACG) can also be constructed in such a manner that the reflecting regions along the axis of symmetry (SA) are structured and thus select and reflect certain diffraction orders and wavelengths. If, as shown in FIG. 7, an element (ACG) is not pivotably disposed, it can only be used to structure the illumination in one spatial direction. If the direction of the structure needs to be rotated, the element must be rotated as well. Similarly, elements with a different orientation of the reflective structure that are disposed on a filter wheel could be rotated into position. Another option is to use an element with circular reflective regions in several directions as in FIG. 2. When dimensioning the size of the regions, the wavelength-dependent location of the diffraction orders and the location of the regions relative to the focus of the orders generated by the excitation light (AL) must be taken into consideration.

FIG. 18 shows the configuration of the achromatic beam divider (ACG). A transparent substrate (TS) comprises reflecting regions (RB). The axis of symmetry (SA) passes through the pass point of the optical axis (OA). The points mark the diffraction orders, with the $0^{th}$ order being located on the optical axis.

It should also be emphasized that the present invention, although preferably used in microscopy, is not limited to the field of microscopy. Because of the optical sectioning capability, this type of configuration for structured illumination can also be of use in other applications that require 3-D imaging or scanning. Examples include surface surveying or medical applications, such as endoscopy. Biochip readers and high-throughput screening are other possible applications in which the described configurations can be used. The invention can also be used to advantage in microscopy and, in particular, in fluorescence microscopy and/or for observing living cells. In medicine, it can be used to advantage, for example, for imaging the retina of the eye (fundus imaging).

It is possible to use a number of different illumination methods and specimen interactions. Examples are fluorescence, luminescence and reflection. The configuration for structured illumination can also be combined with the well-known TIRF (total internal reflection) method, with the structured illumination being applied to the evanescent excitation light [12]. This can be implemented by disposing the diffraction orders (see FIG. 2) and/or the fiber configurations (FIG. 13) and/or the micro-optical module (FIG. 16) in the pupil at a radial distance so that in the specimen space, the resultant angles exceed the critical angle of total reflection.

The light source for the configuration according to the present invention can be selected from a number of different designs and/or combinations thereof: a mercury vapor lamp (HBO), laser, laser diodes, light-emitting diodes or a continuous light source (white light source). In one embodiment of the present invention, the light source can be one of those mentioned above, without, however, being limited thereto.

One important medical use of the method for structured illumination described is fundus imaging of the eye. In this application, the method of structured illumination can be used to advantage to reduce scattered and background light, which can considerably enhance the contrast of the images acquired. Furthermore, when imaging the retina of the eye, the numerical aperture, as well as the resolution associated with this aperture, is limited by the physiological conditions of the eye (limited usable pupil size). In spite of the lower optical resolution, however, it is desirable to use a smaller aperture in order to reduce imaging errors caused by the natural imperfections of the eye. Structured illumination can therefore be used to advantage to enhance the resolution. Thus, it is possible to generate images of the retina with enhanced resolution without increasing the physical aperture of the system (which is difficult and entails considerable disadvantages). This can lead to the desirable resolution of details of the retina (receptor rods/receptor cones) and thus offer an additional benefit to medical diagnostic procedures.

Figure 19:
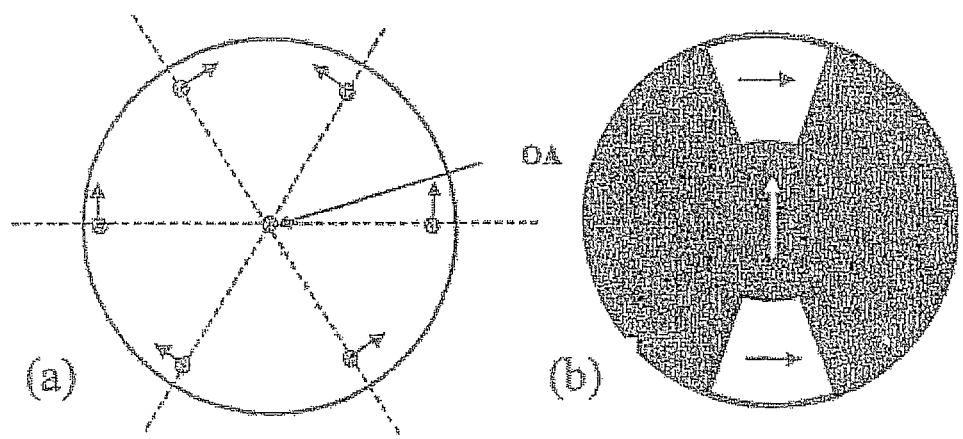
FIGS. 19(*a*) and (*b*) illustrates a polarizer that can be fitted to a rotating mask and FIG. 20 shows the transmission through a polarizer in the mask as shown in FIG. 19.

An important property in all applications discussed is the generation of structured illumination with the highest possible contrast of the structure in the plane of the specimen. The use of coherent light in all cases allows a 100% modulation. However, when using optics systems with higher numerical apertures, such as are normally used in microscopy, polarization plays a decisive role for the interference in the specimen plane, and thus for the contrast of structured illumination. Maximum contrast is possible only if the polarization of the illuminating light is perpendicular to the connecting line of the diffraction orders in the pupil plane (i.e., parallel to the location of the stripe structure in an image plane), as shown in FIG. 19. The polarization of the illuminating light must therefore either be rotated synchronously with the rotation of the diaphragm, or azimuthally polarized light is used. The former can be generated preferably by rotating a $\lambda/2$ plate in the beam path of the linearly polarized excitation light, with the angle of rotation of the wave plate being half as large as that of the diaphragm structure. Accordingly, a rotatable wave plate should be disposed in the beam path of FIG. 11 between source (23) and main color divider (13). In the fiber optical configurations of FIGS. 14-16, the correct polarization is ensured by the appropriate orientation of polarization-preserving fibers. Azimuthally polarized light can be generated from linearly polarized light by means of various methods known from the prior art; one example is described in [11]. This type of polarized light makes it possible, in particular, to use illumination with simultaneous structuring in several spatial directions. As an alternative, the rotating mask can also be fitted with a polarizer which, as shown in FIG. 19, transmits only linearly polarized light. This entails a rotation-dependent loss of light, see FIG. 20, which can be compensated for by suitably synchronized light modulation.

FIG. 19 (*a*) shows the light distribution that is generated in the pupil by the structure shown in FIG. 1. The points marked in green are the sites of the diffraction orders, and the red ring shows the boundary of the pupil. The arrows identify the optimum polarization states of the light. If the $0^{th}$ order contributes to the interference in the specimen plane, this interference must have the same polarization as the higher orders along the broken line. (b) shows the orientation of a polarizer in the mask and the preferred linear input polarization of the light.

Figure 20:
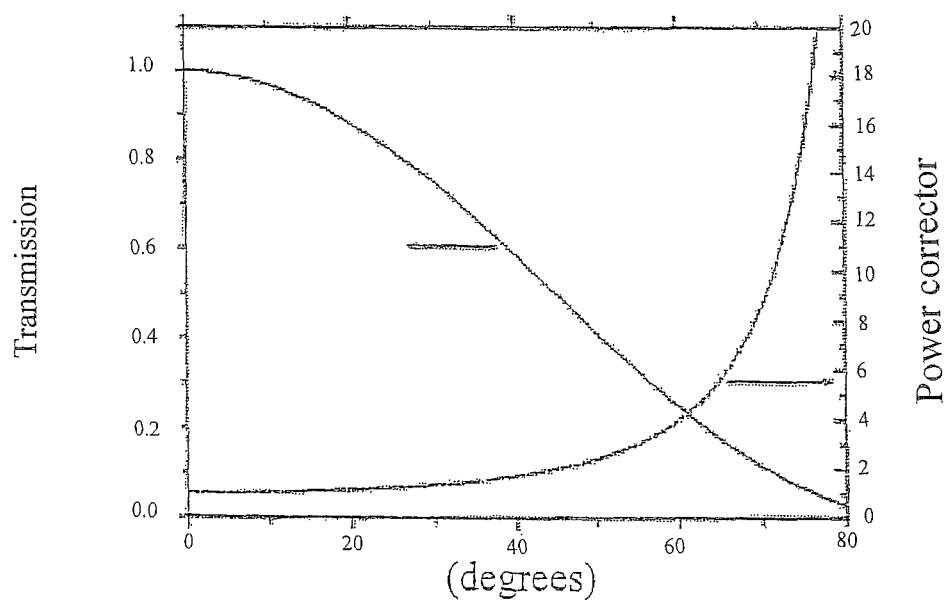

FIG. 20 shows the transmission through a polarizer in the mask as shown in FIG. 19 and correction of the losses by power regulation as a function of the angle of rotation (at 0°, the axis of the polarizer and the input polarization coincide).

While the invention has been illustrated and described in connection with currently preferred embodiments shown and described in detail, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

References

[1] Nell M. A. A., Juskaltis R., Wilson T.: "Method of obtaining optical sectioning by using structured light in a conventional microscope", Opt. Lett. 22 (24): 1905-1907, 1997
[2] Lukosz W., Marchand M., "Optische Auflösung unter Überschreitung der beugungsbedington Auflösungsgrenze", Optica Acta 16, 241-255, 1963
[3] Heintzmann R., Cremer C., "Laterally modulated excitation microscopy: improvement of resolution by using a diffraction grating", in Proc. of SPIE 3568: 185-196, 1998
[4] Nell M. A. A., Juskaitis, A., Wilson, T., "Real time 3D fluorescence microscopy by two beam interference illumination", Opt. Comm. 153: 1-4, 1998
[5] Heintzmann R., Jovin T. M., Cremer C., "Saturated patterned excitation microscopy—a concept for optical resolution improvement" JOSA A, 19 (8) 1599-1609, 2002
[6] Gustafsson, M. G. L., Agard, D. A., Sedat J. W. "Doubling the lateral resolution of wide-field fluorescence microscopy by structured illumination", in Proc. of SPIE 3919: 141-150, 2000
[7] Gustafsson M. G. L., "Nonlinear structured-illumination microscopy: wide-field fluorescence imaging with theoretically unlimited resolution", PNAS 102: 13081-13088, 2005
[8] GERSTNER VOLKER (DE); HECHT FRANK (DE); LANGE RALPH (DE); BLOOS HELMUT (DE), "Assembly for increasing the depth discrimination of an optical imaging system", US2003088067, WO0212945
[9] WILSON TONY (GB); NEIL MARK ANDREW AQUILLA (GB); JUSKAITIS RIMVYDAS (GB), "Microscopy imaging apparatus and method", U.S. Pat. No. 6,376,818, 2002
[10] KEMPE MICHAEL (DE); WOLLESCHENSKY RALF (DE): "Optical system for microscopy comprises focussing the illuminating light on the sample at the plane between it and the eye pupil, with separation of the emitted detection light on or near the same plane", DE10257237
[11] M. Stalder und M. Schadt, "Linearly polarized light with axial symmetry generated by liquid-crystal polarization converters", Opt. Lett. 21 (1996), 1948-1950
[12] George E. Cragg and Peter T. C. So, "Lateral resolution enhancement with standing evanescent waves", Opt. Lett. 25 (2000)) 46-48

The invention claimed is:

1. A method for the optical detection of an illuminated specimen, wherein illuminating light impinges in a spatially structured manner in at least one plane on the specimen, and several images of the specimen are acquired by a detector in different positions of the structure on the specimen, from which images an optical sectional image or an image with enhanced resolution is calculated, comprising: generating a diffraction pattern in the direction of the specimen in or near the pupil of the objective lens or in a plane conjugate to said pupil, and dedicating a structured phase plate with regions of varying phase delays to said diffraction pattern in or near the pupil of the objective lens or in a plane conjugate to said pupil, which phase plate is moved in order to set different phase angles of the illuminating light for at least one diffraction order on the specimen, wherein the illuminating light is structured by a spatially periodic structure located in an intermediate image plane.

2. The method of claim 1, wherein said spatially periodic structure has an N-fold symmetry, where N= any non-zero even natural number, which, in or near the pupil, generates illuminating patterns, symmetrical relative to the optical axis, for a structure in N/2 spatial directions within or on the specimen.

3. The method of claim 1, wherein said phase plate has a circular shape with regions with different phase delays, which regions have an at least partially circular shape, and can be rotated about the optical axis.

4. The method of claim 1, wherein a different phase delay is set by means of different refractive indices and different plate thicknesses.

5. The method of claim 1, wherein said phase delay for the purpose of chromatic correction is varied perpendicular to the optical axis.

6. The method of claim 1, wherein said phase plate is continuously rotated or moved and synchronized with the image acquisition, and wherein an image is acquired once a region with a phase delay different from the preceding one is reached.

7. The method of claim 1, wherein said phase plate is moved in discrete steps.

8. The method of claim 1, wherein diffraction orders are selected by way of a movable diaphragm which is disposed in or near the pupil of the objective lens or in a plane conjugate to said pupil.

9. The method of claim 8, wherein said diaphragm is a circular mask with oppositely lying transmission openings and wherein said diaphragm rotates about the optical axis.

10. The method of claim 8, wherein said diaphragm and said phase plate are disposed on two movable elements that are connected to each other.

11. A configuration for the optical detection of an illuminated specimen, wherein illuminating light impinges in a spatially structured manner in at least one plane on the specimen, and several images of the specimen are acquired by a detector in different positions of the structure on the specimen, from which images an optical sectional image or an image with enhanced resolution is calculated, comprising a diffraction pattern generated in the direction of the specimen, in or near the pupil of the objective lens or in a plane conjugate to said pupil, and a structured phase plate with regions of different phase delays dedicated to said diffraction pattern in or near the pupil of the objective lens or in a plane conjugate to said pupil, which phase plate is constructed so as to be pivotable in order to set different phase angles of the illuminating light for at least one diffraction order on the sample, wherein a spatially periodic structure for structuring the illuminating light is disposed in an intermediate image plane.

12. The configuration of claim 11, wherein the spatially periodic structure has an N-fold symmetry, N= any non-zero even natural number, which, in or near the pupil, generates illumination patterns for structuring in N/2 spatial directions within the specimen, which illumination patterns are symmetrical relative to the optical axis.

* * * * *